US010703136B2

(12) United States Patent
Phillips (10) Patent No.: US 10,703,136 B2
(45) Date of Patent: Jul. 7, 2020

(54) ANTI-THEFT LUG NUT ASSEMBLY

(71) Applicant: Mark Phillips, Houston, TX (US)

(72) Inventor: Mark Phillips, Houston, TX (US)

( * ) Notice: Subject to any disclaimer, the term of this patent is extended or adjusted under 35 U.S.C. 154(b) by 0 days.

(21) Appl. No.: 15/911,023

(22) Filed: Mar. 2, 2018

(65) Prior Publication Data

US 2018/0250981 A1   Sep. 6, 2018

Related U.S. Application Data

(60) Provisional application No. 62/467,010, filed on Mar. 3, 2017.

(51) Int. Cl.
| | |
|---|---|
| *B60B 29/00* | (2006.01) |
| *F16B 23/00* | (2006.01) |
| *B25B 23/00* | (2006.01) |
| *B25B 13/48* | (2006.01) |
| *F16B 41/00* | (2006.01) |
| *B60B 3/16* | (2006.01) |

(52) U.S. Cl.
CPC .......... *B60B 29/003* (2013.01); *B25B 13/485* (2013.01); *B25B 23/0035* (2013.01); *B60B 3/165* (2013.01); *F16B 23/0069* (2013.01); *F16B 41/005* (2013.01); *B60B 2900/3318* (2013.01)

(58) Field of Classification Search
CPC .................. B60B 29/003; B60B 3/165; B60B 2900/3318; F16B 41/005; F16B 23/0069; F16B 23/0061; B25B 13/485; B25B 23/0035

USPC .......... 70/233, 237, 411, 225, 226, 229–232, 70/DIG. 57; 411/402; 81/176.2, 176.15
See application file for complete search history.

(56) References Cited

U.S. PATENT DOCUMENTS

| | | | | |
|---|---|---|---|---|
| 1,692,826 | A * | 11/1928 | Ganz .................... | B62D 43/007 70/231 |
| 2,743,639 | A * | 5/1956 | Lynch .................. | B25B 23/103 81/53.2 |
| 3,668,952 | A * | 6/1972 | Teutsch ................. | B25B 13/06 81/125 |
| 4,027,572 | A * | 6/1977 | Burge ................... | B25B 13/485 411/436 |
| 4,513,643 | A * | 4/1985 | McKean ................ | B23P 19/04 81/53.2 |
| 4,539,872 | A * | 9/1985 | Bochman, Jr. ........ | B25B 23/065 81/431 |
| 4,742,702 | A | 5/1988 | Swertz | |

(Continued)

FOREIGN PATENT DOCUMENTS

EP    0253496    2/1991

*Primary Examiner* — Lloyd A Gall
(74) *Attorney, Agent, or Firm* — Buche & Associates, P.C.; John K. Buche; Bryce A. Johnson (57) ABSTRACT

The present application is directed to an anti-theft lug nut assembly and/or system for vehicular wheel use. A lug nut assembly of this application may be used in connection with each wheel of a particular vehicle. In another instance, multiple lug nut assemblies may be used in connection with a single wheel of a vehicle. In such instances, the lug nut assemblies may incorporate a common key member or distinct key members for use with each distinct lug members. Common wrenches and sockets are unable to engage and turn the lug member of this application as a result of the outer surface configuration of the lug member.

3 Claims, 8 Drawing Sheets

(56) References Cited

U.S. PATENT DOCUMENTS

| | | | | |
|---|---|---|---|---|
| 4,759,237 | A | * | 7/1988 | Fauchet ................ B25B 13/065 29/437 |
| 5,012,704 | A | * | 5/1991 | Wing .................... B25B 13/065 81/124.6 |
| 5,112,176 | A | | 5/1992 | McCauley et al. |
| 5,186,033 | A | * | 2/1993 | Nieczyporowicz .... B21D 17/04 72/123 |
| 5,364,213 | A | | 11/1994 | Teramura |
| 5,517,742 | A | * | 5/1996 | Mann ................. B25B 23/1415 29/456 |
| 6,571,588 | B1 | | 6/2003 | Yuen |
| 6,908,273 | B2 | * | 6/2005 | Mackay ............... B25B 13/485 411/432 |
| 7,445,414 | B1 | | 11/2008 | Notaro et al. |
| D710,683 | S | | 8/2014 | Kishida |
| 8,820,126 | B2 | * | 9/2014 | Lin ....................... B62K 25/02 70/166 |
| 2004/0208723 | A1 | | 10/2004 | Stawarski |
| 2006/0169109 | A1 | * | 8/2006 | Pontieri ............... B24B 45/003 81/176.15 |

\* cited by examiner

ANTI-THEFT LUG NUT ASSEMBLY

CROSS-REFERENCE TO RELATED APPLICATIONS

This non-provisional patent application claims the benefit of and priority from U.S. provisional patent application No. 62/467,010 filed Mar. 3, 2017.

STATEMENT REGARDING FEDERALLY SPONSORED RESEARCH OR DEVELOPMENT

Not applicable.

FIELD OF THE APPLICATION

The application relates generally to a novel wheel lug assembly.

BACKGROUND OF THE APPLICATION

A variety of anti-theft locking lug nut designs have been produced in an attempt to prevent the unauthorized removal of wheels from vehicles. Such designs typically employ keys specially designed to turn and remove a matching lug nut. However, such anti-theft lug nut designs include outer surfaces or end faces that are still removable via a standard wrench or socket by simply forcing a smaller sized wrench or socket onto to the lug nut via a hammer or other object whereby the tight fit of the wrench or socket provides a sufficient torque for removing the anti-theft locking lug nut. Overcoming such shortcomings is desired.

SUMMARY OF THE APPLICATION

The present application is directed to a lug nut assembly including a first member releasably attachable to a wheel lug stud of a vehicle, a second member releasably mateable with the first member, one or more third members releasably mateable with the first and second members, a fourth member mateable with the second member, the fourth member being operationally configured to maintain the one or more third members in a mated position with the first member and the second member.

The present application is also directed to a lug nut assembly including a lug member for engaging a threaded wheel lug stud of a vehicle, a key assembly for engaging the lug member, and a housing member operationally configured to envelope at least part of the lug member and at least part of the key member, the key assembly being operationally configured to act on the lug member in a manner effective to promote turning of the lug member about the threaded wheel lug stud.

The present application is also directed to a lug nut system for vehicular wheels, including (i) a first lug nut assembly having (a) a first lug member with a cylindrical outer surface and one or more cavities disposed about the outer surface in a first layout, the lug member having an open first end for releasable attachment to a threaded wheel lug stud of a vehicle; (b) a first key assembly including (1) a key member having an open first end defining a hollow body for mating with a second end of the lug member, one or more apertures through the body and a second end defined by a torquing surface and (2) one or more fastener members; wherein the one or more cavities and one or more apertures form one or more first fastener joints according to said first layout and wherein the one or more fastener members are operationally configured to mate with the one or more first fastener joints; (c) a first hollow housing member including a first end for receiving the lug member and key assembly therein, the housing member including a length effective for the torquing surface of the key member to extend out beyond a second open end of the housing member; and (ii) at least a second lug nut assembly wherein one or more cavities of a second lug member and one or more apertures of a second key member are operationally configured to form one or more fastener joints having a layout different from said first layout.

It is to be noted, however, that the appended figures illustrate only exemplary embodiments of the invention and are not to be considered limiting of its scope, for the invention may admit to other equally effective embodiments that will be appreciated by those reasonably skilled in the relevant arts. Also, figures are not necessarily made to scale but are representative.

DETAILED DESCRIPTION

Figure 14:
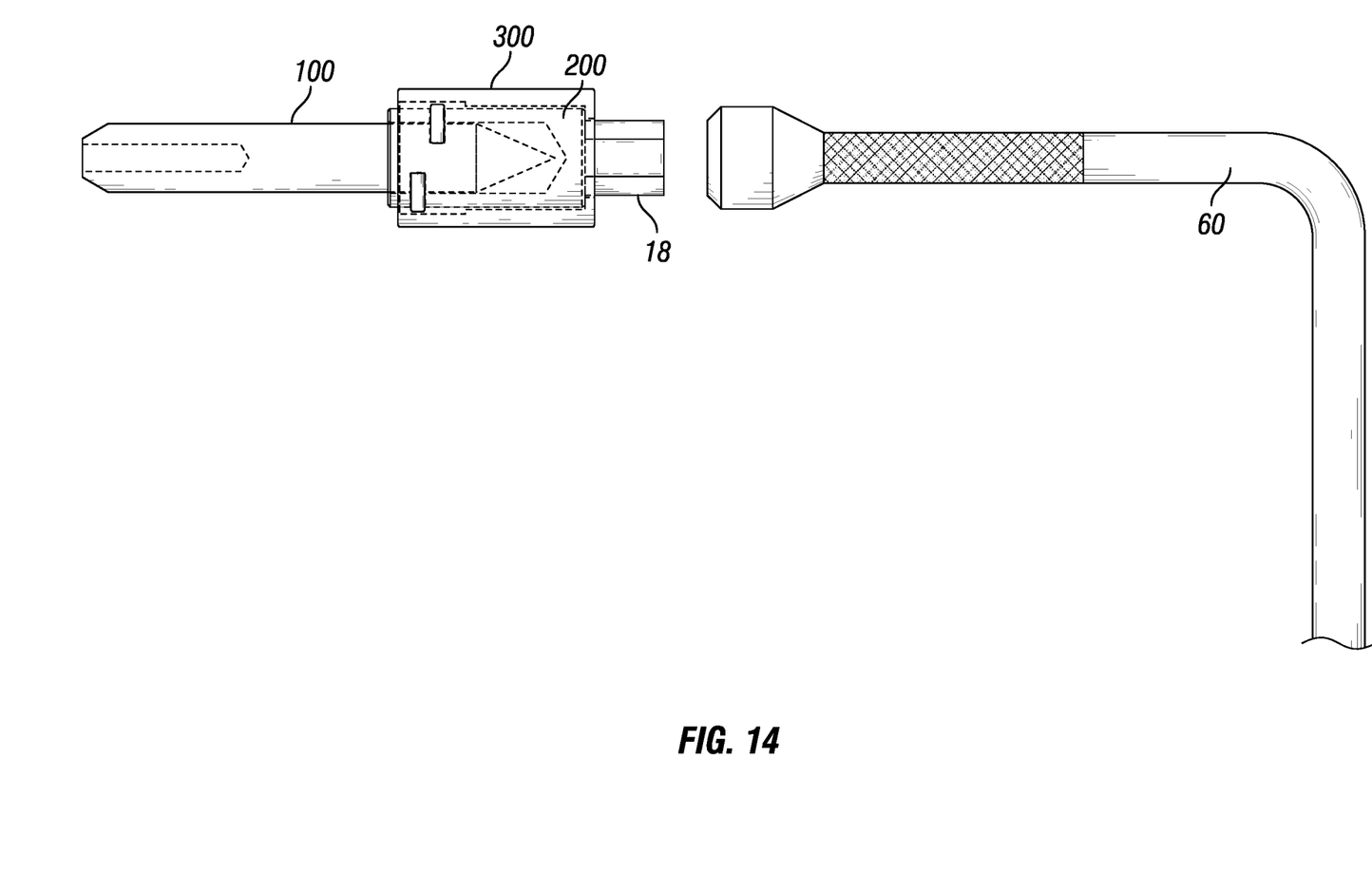
FIG. 14 is a side view of an embodiment of a lug nut assembly and an exemplary vehicle lug wrench usable with the lug nut assembly.

Before describing the invention in detail, it is to be understood that the present assembly, system and method are not limited to particular embodiments. It is also understood that the present assembly may be built to scale. It is also to be understood that the terminology used herein is for the purpose of describing particular embodiments only, and is not intended to be limiting. As used in this specification and the appended claims, the phrase "vehicle lug wrench" may be used interchangeably with the phrase "lug nut wheel wrench" and like phrases known by the skilled artisan. An exemplary vehicle lug wrench 60 is illustrated in FIG. 14. Herein, the term "vehicle" may refer to devices, machines, vessels and other objects operationally configured for conveyance across a travel surface including, but not limited to land surfaces, rail surfaces, track surfaces, ice surfaces, snow surfaces, and combinations thereof. Suitable vehicles include, but are not necessarily limited to automobiles, buses, trucking and transportation trailers, tractors, utility trailers, fork lifts, military land vehicles, and heavy duty construction machinery having wheels. Herein, the phrase "tamper-proof" refers to a lug nut assembly that is only operable with select corresponding compatible component parts and is not operable via a standard wrench or socket or any other incompatible items. The terms "lug nut" and "wheel nut" may be used interchangeably.

In one aspect, the application provides a tamper-proof lug nut for a vehicular wheel. In another aspect, the application provides a tamper-proof lug nut assembly for securing a novel lug nut to a threaded wheel lug stud and for removal of the same.

In another aspect, the application provides an assembly including a lug nut defined by a gripless outer surface, i.e., an outer surface that may not be securely grabbed or clamped or that is otherwise unattachable or unconnectable via commercially available hand tools such as pliers, pipe wrench, vice grips, standard wrenches and sockets. In one embodiment, the outer surface of the lug nut may be provided as a smooth surface and/or polished surface and/or slick surface. The assembly may be provided in a storage container or a carrier such as a protective case for transport and/or storage.

In another aspect, the application provides a system for securing a wheel to a vehicle in a tamper-proof manner, the system including a multi-part assembly and a vehicle lug wrench. In another aspect, the application provides a system for securing a wheel to a vehicle in a tamper-proof manner, the system including a plurality of multi-part assemblies, or parts thereof, and at least one vehicle lug wrench.

In another aspect, the application is directed to a tamper-proof and/or anti-theft lug nut assembly comprising (1) a lug member for engaging a wheel, the lug member having a cylindrical outer surface with one or more cavities disposed about the outer surface; (2) a key member having a first end for mating with the lug member and a second end operationally configured to receive a standard wrench or socket, the key member having one or more apertures corresponding to the one or more cavities; (3) one or more fastener members operationally configured to extend through the one or more apertures into the one or more cavities; and (4) a housing member operationally configured to maintain the one or more fastener members in a mated position with the one or more cavities and one or more apertures.

In another aspect, the application is directed to an anti-theft lug nut system for a vehicle, comprising (1) a plurality of lug members for communicating with lug nut studs, each lug member having a cylindrical outer surface and one or more cavities disposed about the outer surface; (2) a key member for mating with each of the lug members, the key member having one or more apertures operationally configured to align with the one or more cavities of a corresponding lug member and a male member for communicating with a standard wrench or socket; (3) a plurality of fastener members operationally configured to extend through the one or more apertures into the one or more cavities; and (4) a housing operationally configured to mate with the key member in a manner effective to maintain a mated position of the fastener members when mated with the key member.

In another aspect, the application is directed to an (1) anti-theft lug nut system for vehicles, comprising (1) a set of lug members for wheels of a particular vehicle, each lug member having a cylindrical outer surface and one or more cavities disposed about the outer surface in a particular arrangement; (2) a key member for mating with each of the lug members, each key member having one or more apertures operationally configured to align with the one or more cavities of a corresponding lug member and a male torquing member for communicating with a standard wrench or socket; (3) a plurality of set pins operationally configured to extend through the one or more apertures into the one or more cavities; and (4) a housing member operationally configured to mate with the key member in a manner effective to maintain a mated position of the set pins; each vehicle having a set of lug members and key member with a layout or an arrangement of one or more cavities and one or more apertures different than those provided for other vehicles.

In one regard, the present lug nut assembly 3 may be defined as anti-theft lug nut assembly 3 releasably attachable to a threaded wheel lug stud 501. More particularly, with reference to the embodiment of FIG. 1 the lug nut assembly 3 may be defined as an assembly of individual component parts including at least (1) a first member or lug member 100 releasably attachable to a threaded wheel lug stud 501, (2) a second member or key member 200 mateable with the lug member 100, (3) a third member in the form of one or more fastener members operationally configured to releasably mate with the lug member 100 and key member 200 and secure the key member 200 to the lug member 100 in a fixed position and (4) a fourth member provided as an outer sleeve member or housing member 300 operationally configured to maintain the one or more fastener members in a mated position with the lug member 100 and the key member 200 during assembly 3 operation.

Figure 1:
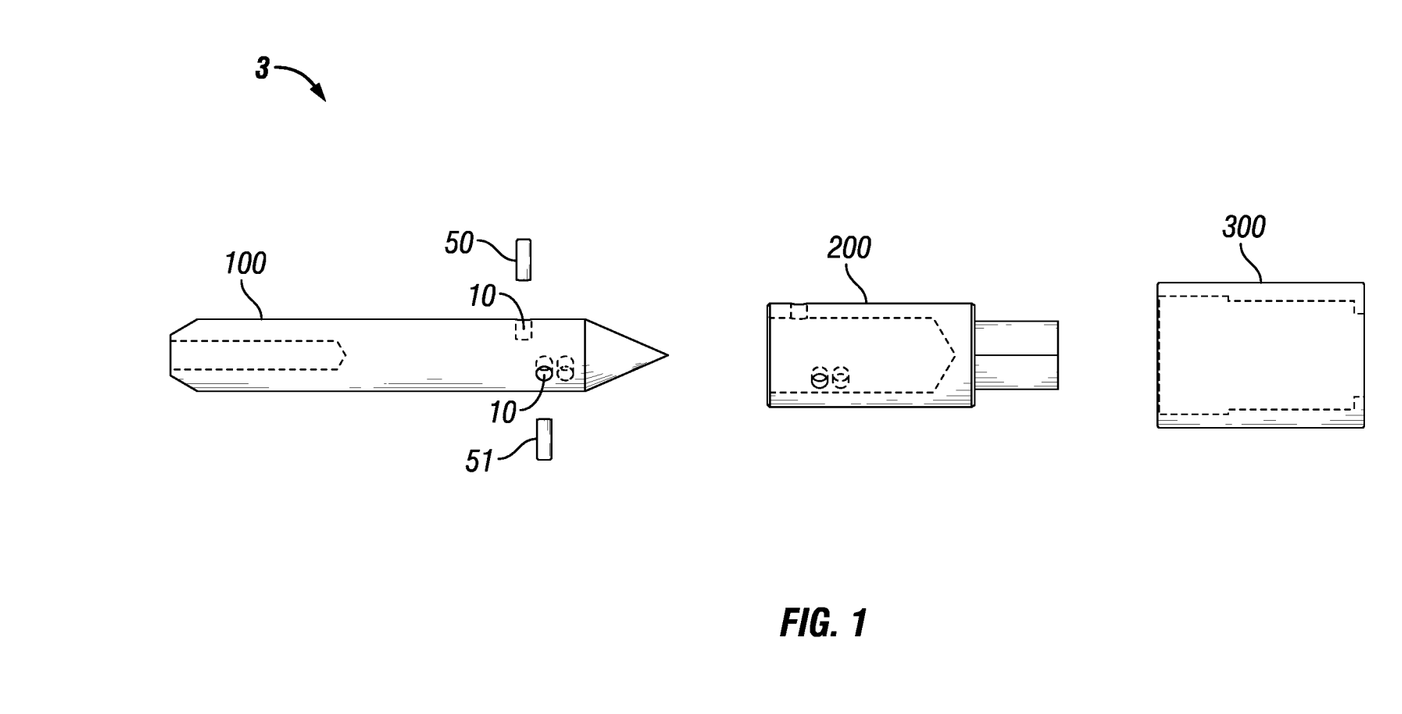
FIG. 1 is an exploded side view of a simplified embodiment of a lug nut assembly of the present application.

In the embodiment of FIG. 1, the lug member 100 is operationally configured as an attachment member for connection to and from a threaded wheel lug stud 501 in a tamper-proof manner as described below. In one implementation, two or more anti-theft lug nut assemblies 3 may be provided indistinguishable in design effective for operable communication between component parts of different assemblies 3. However, to prevent the undesired operation of a particular assembly 3 by another, individual anti-theft lug nut assemblies 3 may also be provided unique in design whereby no two assemblies 3 comprise like or corresponding component parts. In such embodiment, the individual component parts of a particular assembly 3 are operationally configured to communicate only with those component parts of the same assembly 3. In another embodiment, two or more identical lug members 100 may be provided usable with a single key member 200, housing 300 and common fastener members, e.g., four identical lug members 100, one for each wheel 500 of an automobile and a single key member 200, housing 300 and common fastener members for installation and removal of each of the four identical lug members 100.

Figure 2:
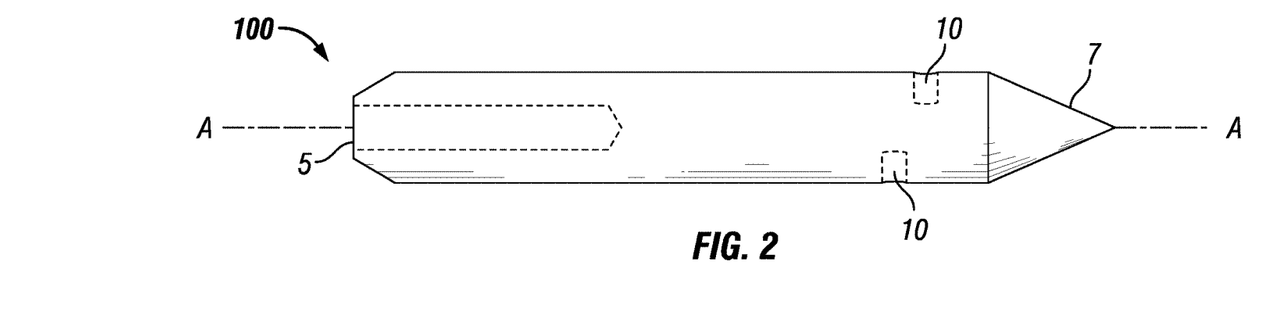
FIG. 2 is a partial phantom side view of a simplified embodiment of a lug member of the present application.
Figure 4:
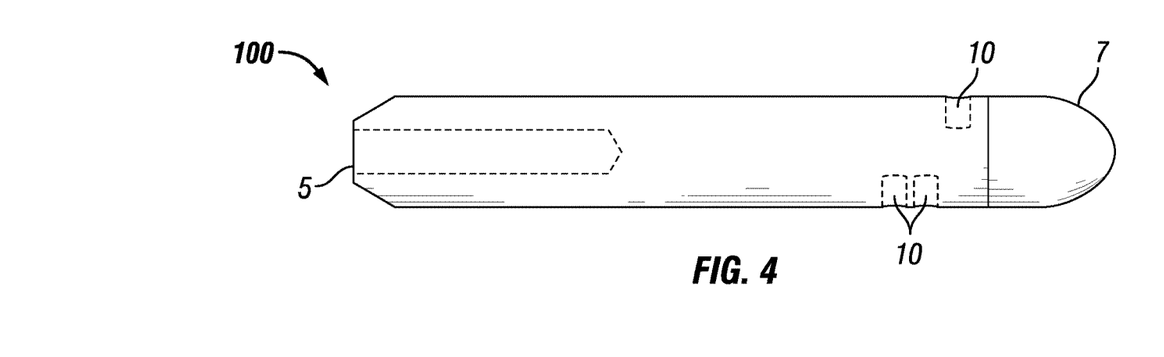
FIG. 4 is another partial phantom side view of a simplified embodiment of a lug member of the present application.

Turning to FIG. 2, one exemplary lug member 100 of this application may include a cylindrical type member having a longitudinal axis A-A with (1) a threaded female type open first end 5 for engaging a threaded wheel lug stud 501 (see FIG. 10) and (2) a closed second end 7. The depth of the open first end 5 may vary as desired but suitably includes a depth for operable mating with the threaded wheel lug stud 501 during wheel operation. Although the thread pattern of the open first end 5 is not limited to in type, one suitable thread pattern includes one or more standard lug stud thread patterns presently found on commercially available vehicles. The second end 7 may be provided in a shape and/or surface configuration as desired, e.g., an outer surface appearance or configuration based on one or more desired aesthetic qualities and/or one or more functional characteristics. In one embodiment, the second end 7 may include a closed surface as shown in FIG. 2, which includes a conical shape terminating according to longitudinal axis A-A. In another embodiment, the second end 7 may be provided as an open end of a desired depth and/or shape. The configuration of the second end 7 is not necessarily limited in size and/or shape and/or surface configuration, but rather may be provided according to one or more laws, regulations and/or one or more desired aesthetic forms for suitable wheel lug nut operation. For example, the second end 7 may be provided as a multi-sided end member, provided as an irregular shaped end member or be provided as a rounded outer surface configuration as shown in FIG. 4. A suitable irregular shaped end member includes a shape other than geometric three dimensional shapes as understood by persons of ordinary skill in the art of geometry.

Figure 3:
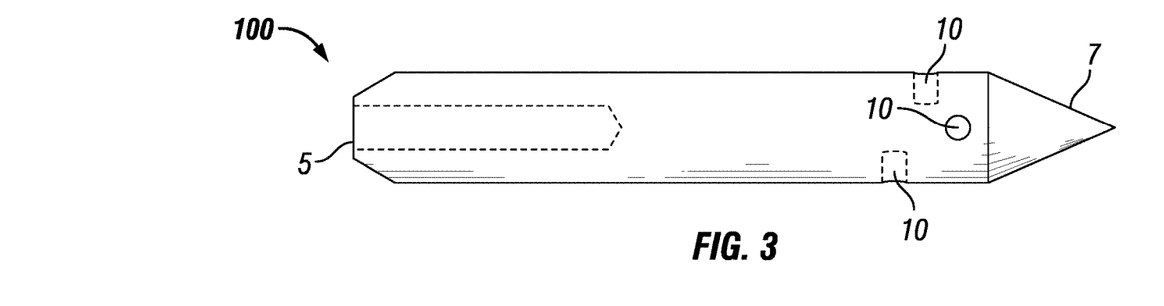
FIG. 3 is another partial phantom side view of a simplified embodiment of a lug member of the present application.
Figure 5:
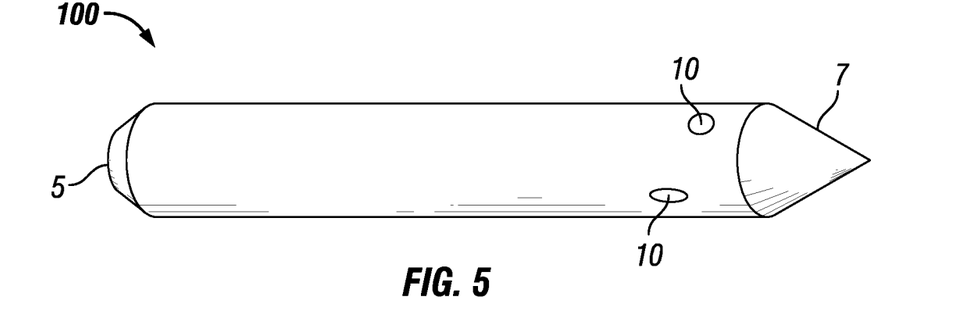
FIG. 5 is a perspective view of another simplified embodiment of a lug member of the present application.
Figure 6:
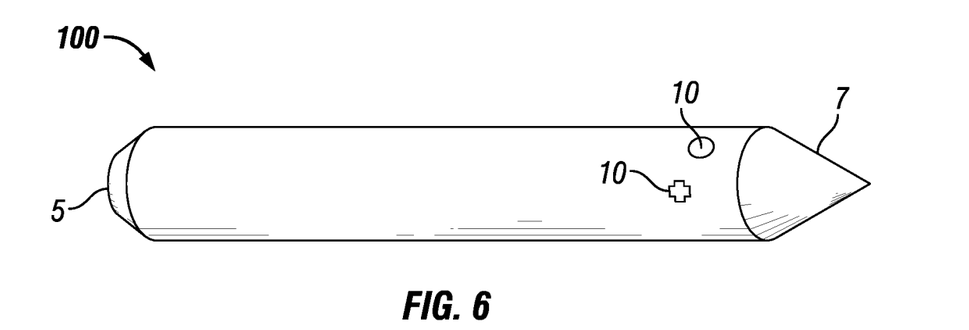
FIG. 6 is a perspective view of another simplified embodiment of a lug member of the present application.

Still referring to FIG. 2, one suitable lug member 100 may include one or more cavities or holes 10 disposed across the surface of the lug member 100 for receiving corresponding fastener members in the form of set pins 50, 51 or the like therein. The hole 10 layout (or "hole layout"), i.e., the axial arrangement or axial alignment of the one or more holes 10 along the outer surface of the lug member 100 according to longitudinal axis A-A may be provided as desired, for example, see FIGS. 2, 3 and 4 illustrating lug members 100 with holes 10 in various axial offset layouts at varying distances from the open first end 5. In addition, the size and/or depth and/or shape of the one or more holes 10 may vary as desired (see FIGS. 5 and 6) requiring corresponding set pins 50, 51 for each individual hole 10. Commercially, it may be advantageous to provide as many product variations as possible in regard to hole number and/or hole placement and/or hole size and/or hole depth and/or hole shape to decrease the chance or opportunity of other persons, e.g., prospective wheel thieves, of possessing a key member 200 matching a particular lug member 100 of another. In other words, variation in hole layout amongst a plurality of lug members 100 thwarts the use of any "master" or "universal" type key member 200 operable with more than one lug member 100.

Figure 7:
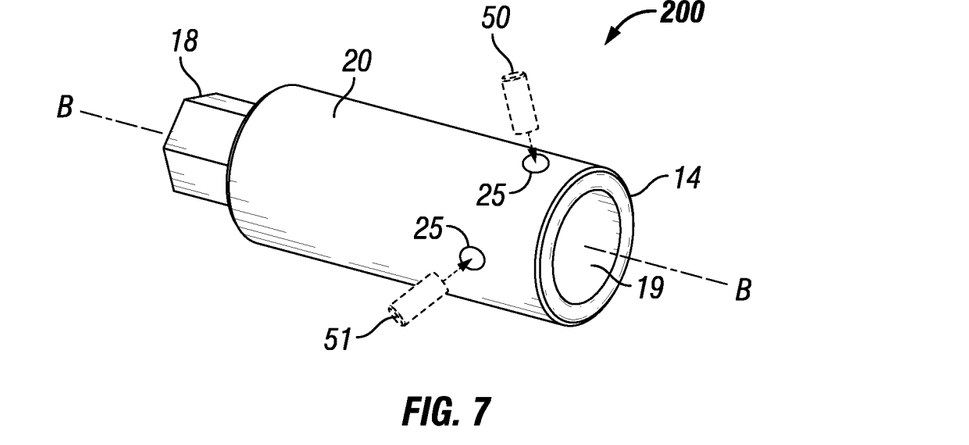
FIG. 7 is a perspective view of a simplified embodiment of a key member of the present application.

Turning to the simplified embodiment as seen in FIG. 7, one suitable key member 200 for operation with the above described lug member 100 may include a hollow or substantially hollow cylindrical type body having a longitudinal axis B-B for concentric mating with a corresponding lug member 100. In this embodiment, the body of the key member 200 includes a cylindrical inner surface 19 and a cylindrical outer surface 20 and one or more apertures 25 there through, the one or more apertures 25 corresponding in layout, i.e., size, shape and arrangement, with the one or more holes 10 of a corresponding lug member 100 providing one or more fastener joints effective for receiving fastener members such as set pins 50, 51 there through. Herein, the combination of the key member 200 and fastener members may be referred to as a "key assembly." In an embodiment where the fastener members or set pins 50, 51 are dowels or dowel pins, the one or more fastener joints formed by corresponding cavities and apertures of the lug member 100 and key member 200 may also be referred to as "dowel joints."

Still referring to FIG. 7, the key member 200 includes an open female type first end 14 and a closed second end including a torquing surface 18 extending out there from, wherein the first end 14 is operationally configured to mate with a corresponding lug member 100 and the torquing surface 18 is operationally configured to communicate with one or more tools for turning the key member 200 during assembly 3 operation. Herein, the torquing surface 18 may include one or more shapes common in hand tool and power tool operations, including, but not necessarily limited to triangular, quadrilateral, hexagonal, heptagonal and octagonal. In another embodiment, the torquing surface 18 may include an irregular shape such as an irregular polygonal shape known to the skilled artisan. In this embodiment, the torquing surface 18 is provided as an external male type surface. In another embodiment, the torquing surface may be provided as a female type internal surface.

In one suitable embodiment, the inner diameter of the inner surface 19 provides for a snug fit or abutment with the outer surface of the corresponding lug member 100 once mated. In operation, the open end 14 of the key member 200 is suitably directed onto the lug member 100 whereby the key member 200 may be turned in a manner effective to align the one or more apertures 25 with the one or more holes 10 forming one or more fastener joints as described above. Once aligned, corresponding set pins 50, 51, etc., may be inserted through the one or more apertures 25 and into the one or more holes 10 in a manner effective to fix the position of the key member 200 in relation to the lug member 100 whereby part of each of the set pins 50, 51, etc., suitably extends out from the outer surface 20 of the key member 200 for retrieval purposes when removing the one or more set pins 50, 51 out from the holes 10 and apertures 25 allowing the key member 200 to be removed from the lug member 100.

Figure 8:
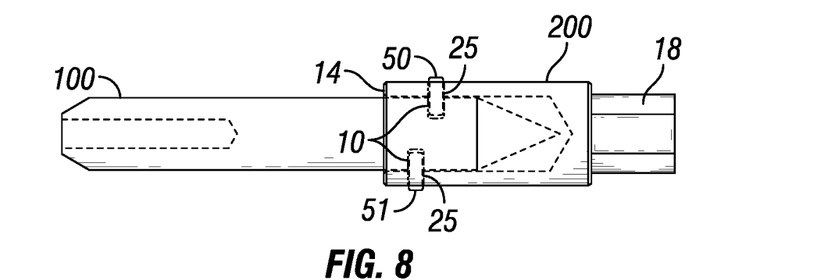
FIG. 8 is a partial phantom side view of a lug member and key assembly in a fixed mated position.

Exemplary set pins 50, 51 as seen in FIGS. 7 and 8 that are operationally configured for mating with circular holes 10 and apertures 25 may include items such as dowel pins and/or other elongated cylindrical members or other elongated members having a longitudinal axis and being operationally configured to set the orientation of a key member 200 in a fixed position relative a corresponding lug member 100 during assembly 3 operation. With reference to FIG. 8, the longitudinal axis of each of the set pins 50, 51 is perpendicular to the longitudinal axis A-A of the lug member 100. In another embodiment, one or more fastener members may be set at a non-perpendicular orientation in relation to the longitudinal axis A-A of the lug member 100. Suitable elongated members may include, but are not necessarily limited to screws, bolts, clevis pins, cotter pins, and combinations thereof. In addition, suitable set pins and other elongated members as described above may be constructed from one or more materials suitable for intended lug nut type operation. Exemplary set pin materials of construction may include, but are not necessarily limited to metals, polymeric materials, woods, glass, filled composite materials, and combinations thereof. One exemplary metal includes stainless steel. Another exemplary metal includes aluminum. Another exemplary metal includes 4140 alloy steel. It is further contemplated that in another embodiment the one or more set pins be magnetized in a manner effective to assist in maintaining one or more set pins in a mated position with corresponding holes 10 and apertures 25.

With further reference to FIGS. 7 and 8, the key member 200 may be specific for operating with one or more particular tools such as a vehicle lug wrench 60 as commonly provided by a vehicle manufacturer. For example, the torquing surface 18 of the key member 200 may be defined by a male type hexagonal torquing surface 18, or the like, as commonly known in the field of lug nuts, operationally configured to communicate with one or more tools in a manner effective to turn the key member 200 and lug member 100 to which the key member 200 is secured. One suitable tool includes a vehicle lug wrench 60 with a female opening for mating with the torquing surface 18 in a manner effective for wrench turning operations. Likewise, the length of the torquing surface 18 may vary as desired. In one implementation, the torquing surface 18 includes a length operationally configured to work with common vehicle lug wrenches such as a vehicle lug wrench 60 as seen in FIG. 14. In another implementation, the torquing surface 18 may include a unique size and length and/or configuration corresponding to a specific wrench type device for lug member 100 attachment and removal.

The size of the torquing surface 18 may vary and may be provided for use with metric tools or Standard American equivalent tools or SAE tools as understood by the skilled artisan. One exemplary torquing surface 18 may be provided for use with a ⅞ inch vehicle lug wrench 60 as is understood by persons of ordinary skill in the art. Table 1 below provides a Metric/Standard conversion chart for exemplary wrench sizes. Table 1 is not meant to be limiting in scope as smaller and larger wrench sizes are well known to persons of ordinary skill in the art.

TABLE 1

| Metric (mm) | Standard (inches) |
|---|---|
| 8 | 5/16 |
| 10 | 3/8 |
| 11 | 7/16 |
| 13 | 1/2 |
| 14 | 9/16 |
| 16 | 5/8 |
| 19 | 3/4 |
| 21 | 13/16 |
| 22 | 7/8 |
| 24 | 15/16 |
| 25 | 1 |
| 29 | 1 1/8 |
| 32 | 1 1/4 |
| 34 | 1 5/16 |
| 35 | 1 3/8 |
| 38 | 1 1/2 |
| 41 | 1 5/8 |
| 43 | 1 11/16 |
| 45 | 1 3/4 |
| 48 | 1 7/8 |
| 51 | 2 |
| 57 | 2 1/4 |
| 64 | 2 1/2 |
| 67 | 2 5/8 |
| 70 | 2 3/4 |
| 75 | 2 15/16 |
| 76 | 3 |
| 80 | 3 1/8 |
| 83 | 3 1/4 |
| 89 | 3 1/2 |
| 95 | 3 3/4 |
| 99 | 3 7/8 |

Figure 9:
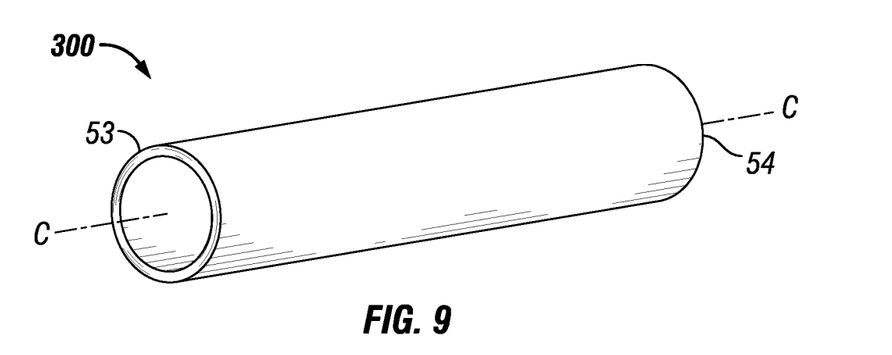
FIG. 9 is a perspective view of a simplified embodiment of a housing member of the present application.
Figure 10:
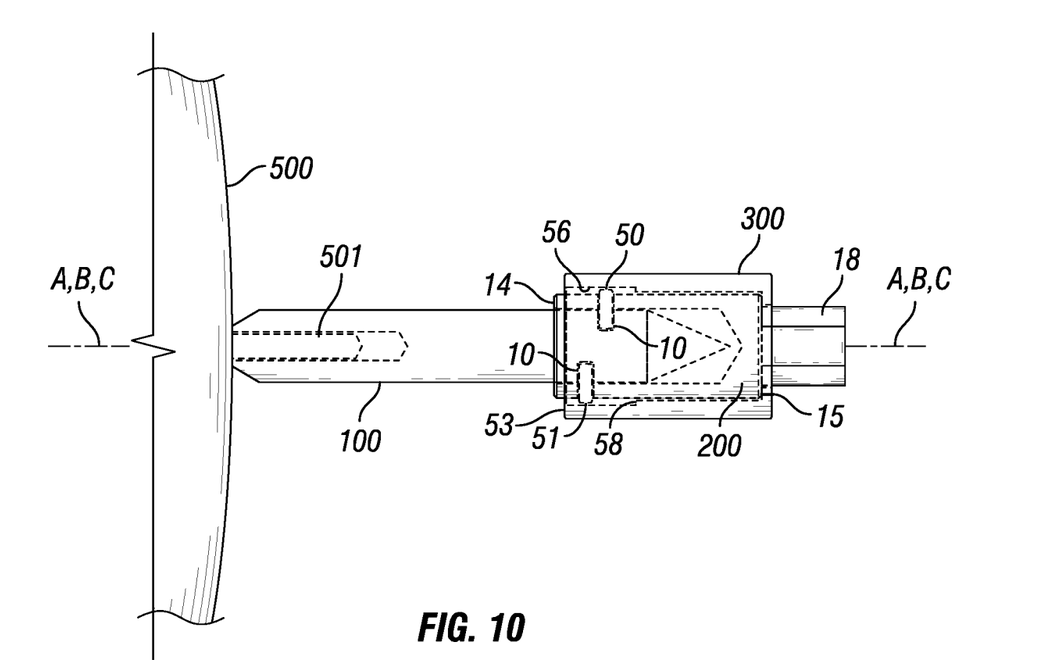
FIG. 10 is a partial phantom side view of an embodiment of a lug nut assembly attached to a wheel.
Figure 11:
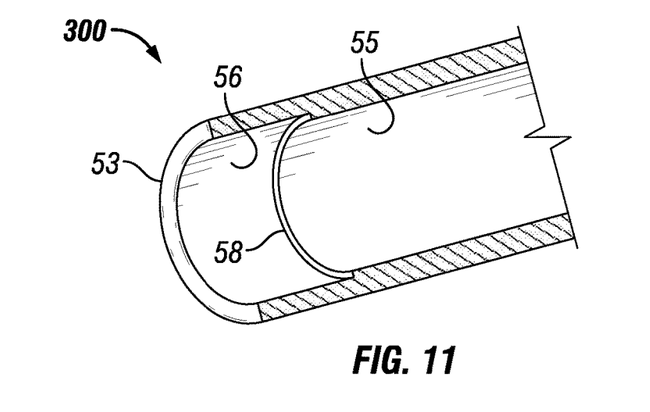
FIG. 11 is a perspective sectional view of an exemplary housing member of the present application.

Turning to FIGS. 9-11, one suitable housing member 300 may include a hollow sleeve type member operationally configured to envelope at least part of the lug member 100 and the key member 200 during assembly 3 operation. One suitable housing member 300 may include a cylindrical or tubular type member as shown with an open first end 53 and an open second end 54, the housing member 300 having a longitudinal axis C-C for concentric alignment with a corresponding lug member 100 and key member 200 once assembled (see FIG. 10). In one embodiment, the inner surface of the housing member 300 may include a continuous or smooth type surface for covering a lug member 100 and key member 200. In another embodiment as shown in FIG. 11, the inner surface of the housing member 300 may also include a first surface 55 defining a first inner diameter and a second surface 56 defining a second inner diameter. Suitably, the inner surface configuration of the housing member 300 may be realized as desired. For example, one suitable housing member 300 may be formed via a mold. In another embodiment, a first end 53 of the housing member 300 may be milled to form the second surface 56. As further shown, the housing member 300 may include a length as desired or as otherwise required for operation with other component parts of the assembly 3, see for example, FIG. 9 and FIG. 10. It is also contemplated that a housing member 300 as shown in FIGS. 9 and 10 may comprise a non-cylindrical outer surface, e.g., multi-sided outer surface, as desired.

Referring to FIG. 10, a suitable second surface 56 may include an inner diameter effective to provide clearance for the corresponding set pins 50, 51 extending out passed the outer surface 20 of the key member 200. As depicted, the second surface 56 of the housing member 300 covers the set pins 50, 51 in a manner effective to maintain each of the set pins in a mated position within their corresponding holes 10. As such, the housing member 300 operates as a shroud or cover effective to keep the set pins 50, 51 from falling out of the holes 10 as the lug member 100 is being turned clockwise or counter-clockwise.

With particular attention to FIG. 11, the junction between the first surface 55 and the second surface 56 is suitably defined by a raised wall type surface or lip 58 operationally configured to contact the "first set pin" or set pin located nearest the second end 7 of the lug member 100 (see set pin 50 in FIG. 10). As such, the lip 58 operates as a stop effective for dictating the travel distance of the housing member 300 as the housing member 300 is being directed over the key member 200. Suitably, the length of the second surface 56 is effective to cover the most distant set pin although the first end 53 of the housing member 300 may terminate at a point beyond the most distant set pin (see the housing member 300 and set pin 51 in FIG. 10). As also seen in FIG. 10, in one suitable embodiment the first end 53 terminates at a point apart from a corresponding vehicle wheel 500 a distance effective to obviate contact with the vehicle wheel 500 thereby eliminating potential for surface damage such as scratches to the vehicle wheel 500 that may otherwise be caused by contact with the housing member 300.

As seen in FIG. 10, once assembled the first end 53 of the housing member 300 may terminate at one or more points including a point less than the point of termination of the corresponding first open end 14 of the key member 200. In addition, the second end 54 of the housing member 300 suitably terminates at a point clear of the torquing surface 18 in order to not obstruct operation of a vehicle lug wrench 60 or other designated tool with the torquing surface 18. As shown, the second end 54 may terminate at a point near to or about equal to a second end 15 of the cylindrical portion of the key member 200. In another embodiment, the second end 54 may terminate a greater distance from the torquing surface 18.

Figure 12:
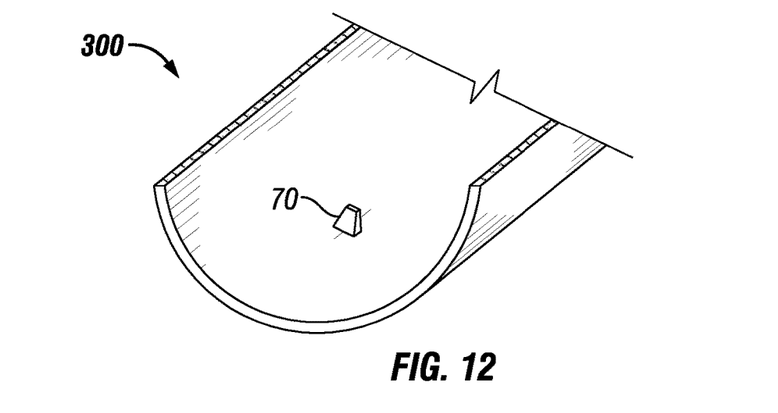
FIG. 12 is a perspective sectional view of another exemplary housing member of the present application.
Figure 13:
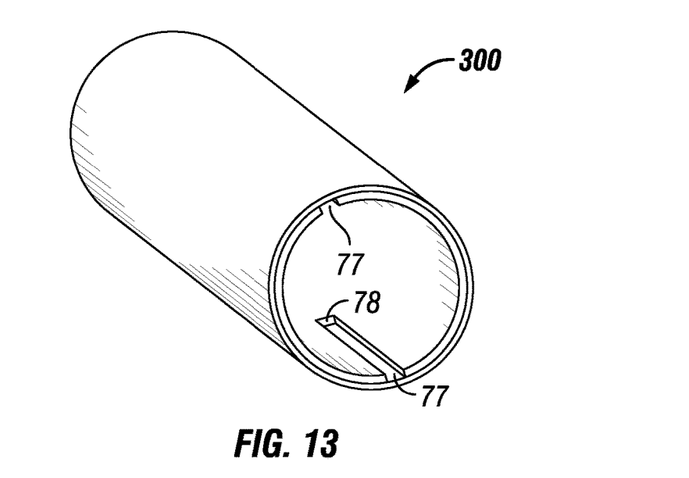
FIG. 13 is a perspective view of another exemplary housing member of the present application.

In another embodiment, the inner surface of a housing member 300 may include a continuous inner surface of a uniform inner diameter with an individual raised member 70, projection or wall type member extending out from the inner surface for contacting a first set pin. A suitable raised member 70 may include a raised bump, bulge, or other protuberance effective as a stop for receiving a set pin in an abutment position (see FIG. 12). In still another embodiment, the inner surface of the housing member 300 may include grooves or channels 77 with stopper type end walls 78 for receiving corresponding set pins in an abutment position therein as the housing member 300 is being directed over the key member 200 (see FIG. 13).

Without limiting the invention, the lug member 100, key member 200 and housing member 300 may be constructed from one or more materials as desired effective for providing operative structural support in connection with lug member 100 removal and/or installation. In one implementation, each of the lug member 100, key member 200 and housing member 300 may be constructed from one or more like material(s). In another implementation, the lug member 100, key member 200 and housing member 300 may be constructed from one or more different materials. Suitable materials of construction may include, but are not necessarily limited to, those materials resistant to chipping, cracking, excessive bending and reshaping as a result of weathering, heat, moisture, other outside mechanical and chemical influences, as well as impacts and forces applied to one or more of the lug member 100, key member 200 and housing member 300. Particular materials of construction may include, but are not necessarily limited to metals, polymeric materials, cementitious materials, woods, filled composite materials, and combinations thereof. Suitable metals include ferrous metals and non-ferrous metals. A suitable ferrous metal may include an iron alloy, for example, steel. In addition, one or more of the lug member 100, key member 200 and housing member 300 may include one or more outer protective layers as desired. Suitable protective layers may be constructed from materials including, but not necessarily limited to rubber, plastic, and combinations thereof. Moreover, the one or more of the lug member 100, key member 200 and housing member 300 may be formed via molds, machine formed, three-dimensional printing, and combinations thereof.

One suitable lug member 100 and/or key member 200 and/or housing member 300 may be constructed from stainless steel. Another suitable lug member 100 and/or key member 200 and/or housing member 300 may be constructed from titanium. Another suitable lug member 100 and/or key member 200 and/or housing member 300 may be constructed from titanium alloys. Another suitable lug member 100 and/or key member 200 and/or housing member 300 may be constructed from 4140 alloy steel. In an embodiment including a lug member 100 and key member 200 constructed from one or more metals, it is contemplated that a corresponding housing member 300 be constructed from one or more non-metals, e.g., rubber, plastic, and combinations thereof.

Lug members 100 of this application may also include any surface coloring and/or texture and/or surface design(s) as desired. Likewise, corresponding key member 200 and/or housing member 300 may include any surface coloring and/or texture and/or surface design(s) as desired. For example, a lug member 100 and/or key member 200 and/or housing member 300 may include a surface appearance substantially similar or identical as a target vehicle wheel 500 to which the lug member 100 is to be used. The lug member 100 and/or key member 200 and/or housing member 300 may also be constructed from one or more transparent materials.

In one example of assembly 3 operation, a vehicle wheel 500 is positioned on a threaded wheel lug stud 501 and a lug member 100 is threaded onto the threaded wheel lug stud 501 of the vehicle wheel 500. The key member 200 is then slipped onto the lug member 100 with the apertures 25 being aligned with their corresponding holes 10. Once aligned, the set pins 50, 51, etc., may be inserted through the apertures 25 into the holes 10 to a mated position therein. Thereafter, a housing member 300 may be slipped over the key member 200 to a contact position with the first set pin 50 as described above. Via the torquing surface 18, the key member 200 is used to tighten the lug member 100 into place to a specified torque setting so as to secure the vehicle wheel 500 in combination with several other standard lug nuts and/or additional locking lug members 100. The assembly 3 of this application makes it significantly more difficult, if not impossible, for a non-authorized user to remove a vehicle wheel 500 from a vehicle.

The invention will be better understood with reference to the following non-limiting example, which is illustrative only and not intended to limit the present invention to a particular embodiment.

Example 1

Figure 15:
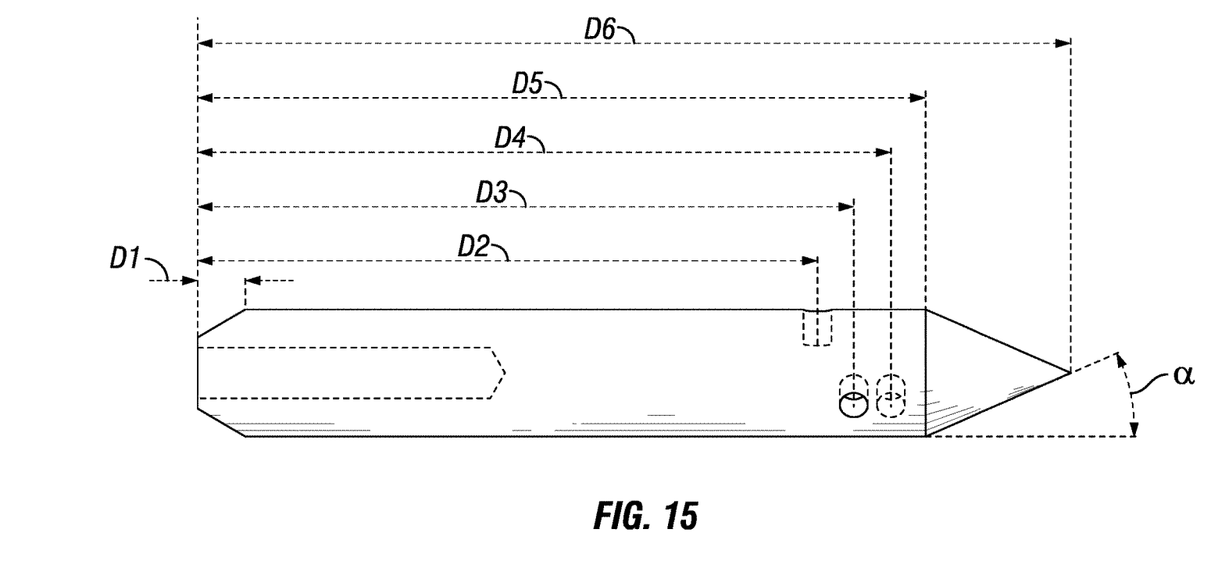
FIG. 15 is a side view of an embodiment of a lug member.
Figure 16:
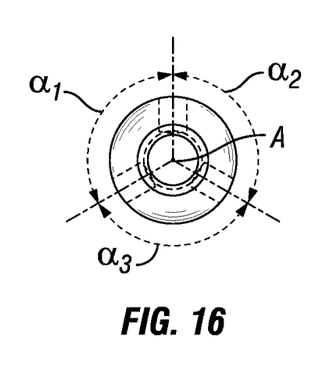
FIG. 16 is a back view of the lug member of FIG. 15.
Figure 17:
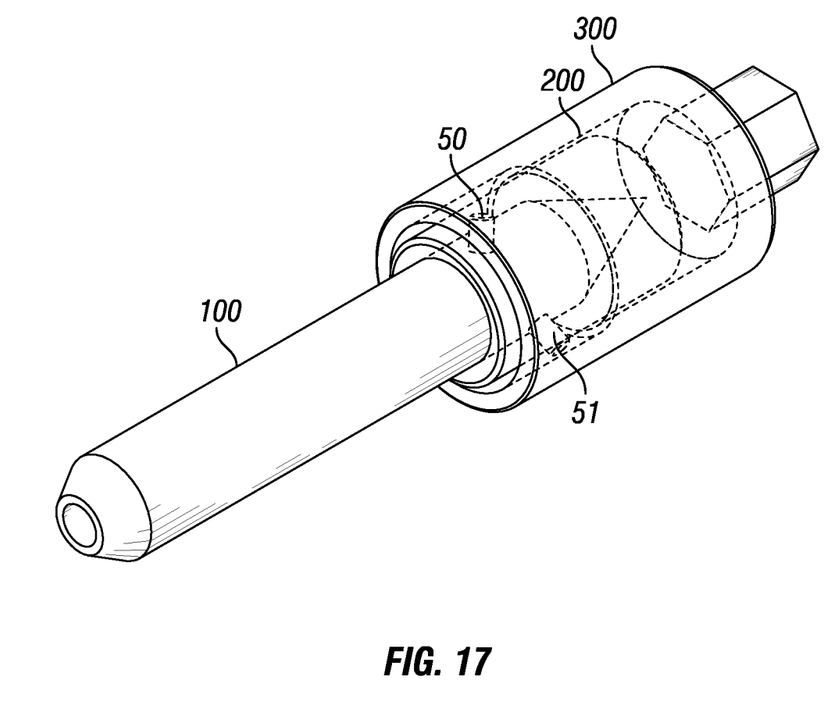
FIG. 17 is a perspective phantom view of an embodiment of a lug nut assembly including the lug member of FIG. 15.

In a first non-limiting example, an assembly 3 including a lug member 100 having three holes 10 as shown in FIGS. 15-17 is provided having the following dimensions:

Angle ($\alpha$) of closed second end 7: 23.50 degrees;
D1: 0.81 cm (0.32 inches);
D2: 10.8 cm (4.25 inches);
D3: 11.4 cm (4.50 inches);
D4: 12.1 cm (4.75 inches);
D5: 12.7 cm (5.00 inches);
D6: 15.2 cm (6.00 inches);
$\alpha_1$: 120.0 degrees
$\alpha_2$: 120.0 degrees
$\alpha_3$: 120.0 degrees The present application further provides a lug nut assembly of individual component parts including a first member releasably attachable to a wheel lug stud of a vehicle, a second member releasably mateable with the first member, one or more third members releasably mateable with the first and second members, a fourth member mateable with the second member, the fourth member being operationally configured to maintain the one or more third members in a mated position with the first member and the second member. The first member includes an open first end threadedly attachable to a threaded wheel lug stud, the second member includes an open female type first end for mating with the first member and the fourth member includes an inner surface for receiving the second member therein. The first member includes an outer surface with one or more cavities disposed along the outer surface in a first layout and the second member includes a hollow member defining an inner surface and an outer surface with one or more apertures there through, the one or more apertures being disposed along the second member in a layout corresponding to said first layout. The one or more third members are releasably mateable with the one or more cavities and the one or more apertures.

The present application further provides a lug nut assembly including a first member or lug member for engaging a threaded wheel lug stud of a vehicle, a key assembly for engaging the lug member, and a housing member operationally configured to envelope at least part of the lug member and at least part of the key member, the key assembly being operationally configured to act on the lug member in a manner effective to promote turning of the lug member about the threaded wheel lug stud. The lug member includes a threaded inner surface and an outer surface with one or more cavities disposed along the outer surface and wherein the key assembly includes a second member or key member and one or more fastener members including, but not necessarily limited to set pins, the key member having a hollow body with one or more apertures there through, the key member having an open female type first end mateable with the lug member and a closed second end operationally configured to communicate with one or more tools for turning the key member and lug member about the threaded wheel lug stud. The one or more fastener members are releasably mateable with the one or more cavities and one or more apertures. The closed second end of the key member includes a torquing surface.

Although the assembly 3 is described herein in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed device, system and method, whether or not such embodiments are described and whether or not such features are presented as being a part of a described embodiment. Thus, the breadth and scope of the claimed invention should not be limited by any of the above-described embodiments. Persons of ordinary skill in the art will recognize that many modifications may be made to the present application without departing from the spirit and scope of the invention. The embodiment(s) described herein are meant to be illustrative only and should not be taken as limiting the invention, which is defined in the claims.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. The presence of broadening words and phrases such as "one or more," "at least," "but not limited to" or other like phrases in some instances shall not be read to mean that the narrower case is intended or required in instances where such broadening phrases might be absent. Likewise, where this document refers to technologies that would be apparent or known to one of ordinary skill in the art, such technologies encompass those apparent or known to the skilled artisan now or at any time in the future.

I claim:

1. A lug nut assembly (3) comprising:
   a lug member (100) releasably attachable to a threaded wheel lug stud (501) of a vehicle, wherein the lug member (100) includes an open first end (5) threadedly attached to the threaded wheel lug stud (501), wherein the lug member (100) includes an outer surface with one or more cavities (10) disposed along the outer surface in a first layout;
   a key member (200) releasably mated with the lug member, wherein the key member (200) includes a hollow body with an open female type first end that is mated with the lug member (100), wherein the hollow body has a sidewall that includes one or more apertures (25) there through, the one or more apertures (25) being disposed along the hollow body in a layout corresponding to said first layout, and wherein the hollow body includes a torqueing surface (18);
   one or more fastener members releasably disposed in said one or more cavities (10) and one or more apertures (25) so that the one or more fastener members are mated with the lug and key members (100,200) and thereby secure the key member (200) to the lug member (100) in a fixed position, wherein the one or more fastener members are one or more set pins (51); and
   a housing member (300) that is tubular and includes an open first end (53), an open second end (54), an external surface, a first inner surface (55), a second inner surface, and a junction (58) between the first and second inner surfaces, wherein the housing member (300) is mated with the key member (200) via receipt of the key member (200) by the first open end (53) and the first inner surface (55) of the housing member (300), the housing member (300) maintaining via the second inner surface (56) the one or more fastener members in a mated position with the lug member (100) and the key member (200), wherein the torqueing surface (18) of the key member (200) is exposed at the second open end (54) of the housing member (300).

2. A lug nut assembly comprising:
   a lug member engaging a threaded wheel lug stud of a vehicle, wherein the lug member includes a threaded inner surface and an outer surface with one or more cavities disposed along the outer surface;
   a key assembly engaging the lug member, wherein the key assembly includes a key member and one or more fastener members, the key member having a hollow body with one or more apertures there through, the key member having an open female type first end mated with the lug member and a closed second end operationally configured to communicate with one or more tools for turning the key member and lug member about the threaded wheel lug stud, wherein the closed second end of the key member includes a torqueing surface, wherein the one or more fastener members are mated with the one or more cavities and one or more apertures;
   a housing member that is tubular and includes an open first end, an open second end, an external surface, a first inner surface, a second inner surface, and a junction between the first and second inner surfaces, wherein the housing member envelopes at least part of the lug member and at least part of the key member, wherein the housing member enveloping at least the part of the key member and at least the part of the lug member causes the one or more fastener members to remain mated with the one or more cavities and one or more apertures, wherein the one or more fastener members are one or more set pins, wherein the key assembly is operationally configured to act on the lug member in a manner effective to promote turning of the lug member about the threaded wheel lug stud.

3. A lug nut system for vehicular wheels, including:

a first lug nut assembly having
- a first lug member with a cylindrical outer surface and one or more cavities disposed about the outer surface in a first layout, the lug member having an open first end releasably attached to a threaded wheel lug stud of a vehicle;
- a first key assembly including
  (1) a key member having an open first end defining a hollow body for mating with a second end of the lug member, one or more apertures through the body and a second end defined by a torquing surface and
  (2) one or more fastener members;
  wherein the one or more cavities and one or more apertures form one or more first fastener joints according to said first layout and wherein the one or more fastener members are operationally configured to mate with the one or more first fastener joints;
- a first hollow housing member including a first end receiving the lug member and key assembly therein, the housing member including a length effective for the torquing surface of the key member to extend out beyond a second open end of the housing member, wherein the housing member receiving the key assembly therein causes the one or more fastener members to remain mated with the one or more cavities and one or more apertures by interfacing of an inner surface of the housing member with the one or more fastener members, wherein the one or more fastener members are one or more set pins; and
- at least a second lug nut assembly wherein one or more cavities of a second lug member and one or more apertures of a second key member are operationally configured to form one or more fastener joints having a layout different from said first layout.

* * * * *